US012802908B2

(12) United States Patent
Spezie et al.

(10) Patent No.: US 12,802,908 B2
(45) Date of Patent: Nov. 17, 2026

(54) ELECTROMECHANICAL DISCONNECTOR BETWEEN A HIGH-VOLTAGE OVERHEAD TRANSMISSION LINE AND A VOLTAGE TRANSFORMER

(71) Applicant: TERNA S.P.A., Rome (IT)

(72) Inventors: Roberto Spezie, Rome (IT); Francesco Palone, Rome (IT); Andrea Valant, Rome (IT); Roberto Bruno Mattiet, Rome (IT); Filippo Ghibaudi, Rome (IT)

(73) Assignee: TERNA S.P.A., Rome (IT)

( * ) Notice: Subject to any disclaimer, the term of this patent is extended or adjusted under 35 U.S.C. 154(b) by 222 days.

(21) Appl. No.: 18/720,192

(22) PCT Filed: Dec. 16, 2022

(86) PCT No.: PCT/IT2022/050334
§ 371 (c)(1),
(2) Date: Jun. 14, 2024

(87) PCT Pub. No.: WO2023/112072
PCT Pub. Date: Jun. 22, 2023

(65) Prior Publication Data

US 2025/0062092 A1 Feb. 20, 2025

(30) Foreign Application Priority Data

Dec. 17, 2021 (IT) ........................ 102021000031706

(51) Int. Cl.
*H01H 31/12* (2006.01)

(52) U.S. Cl.
CPC ........ *H01H 31/127* (2013.01); *H01H 31/122* (2013.01)

(58) Field of Classification Search
CPC ..................... H01H 31/122–127; H01H 9/102
See application file for complete search history.

(56) References Cited

U.S. PATENT DOCUMENTS 2,301,551 A 11/1942 Kyle
3,073,993 A * 1/1963 Leonard .................... H01T 1/10
361/104
3,810,060 A 5/1974 Hubbard
(Continued)

OTHER PUBLICATIONS

International Search Report and Written Opinion received in PCT Application No. PCT/IT2022/050334, dated Mar. 28, 2023 in 12 pages.

(Continued)

*Primary Examiner* — Jacob R Crum
(74) *Attorney, Agent, or Firm* — Knobbe, Martens, Olson & Bear, LLP

(57) ABSTRACT

An electro-mechanical disconnector mounted between an HV overhead power line conductor and a voltage transformer, mounted on a support of the support power line of HV overhead power line conductors. The electro-mechanical disconnector comprises an isolating element and a sacrificial element arranged in series with each other. The sacrificial element is made of a material capable of melting upon the passage of a fault current, and the sectioning element is capable of moving to an electrically insulating distance from the conductor following the melting of the element.

8 Claims, 3 Drawing Sheets

(56) References Cited

U.S. PATENT DOCUMENTS

| | | | | |
|---|---|---|---|---|
| 3,958,205 | A * | 5/1976 | Beard | H01H 85/46<br>337/186 |
| 4,450,425 | A | 5/1984 | Manning | |
| 7,948,352 | B2 * | 5/2011 | Tang | H01H 31/127<br>340/687 |
| 2009/0091416 | A1 | 4/2009 | Tang et al. | |
| 2020/0119588 | A1 * | 4/2020 | Salinas | H04B 5/79 |
| 2022/0163306 | A1 * | 5/2022 | Cawood | H01H 85/042 |

OTHER PUBLICATIONS

Search Report received in IT Application No. IT202100031706, dated Aug. 3, 2022 in 18 pages.

* cited by examiner

ELECTROMECHANICAL DISCONNECTOR BETWEEN A HIGH-VOLTAGE OVERHEAD TRANSMISSION LINE AND A VOLTAGE TRANSFORMER

CROSS-REFERENCE TO RELATED APPLICATIONS

This application is the U.S. National Phase under 35 U.S.C. § 371 of International Application PCT/IT2022/050334, filed Dec. 16, 2022, which claims priority to IT Patent Application No. 102021000031706, filed on Dec. 17, 2021, the contents of each of which are incorporated herein by reference in its entirety.

TECHNICAL FIELD

The present invention relates to a technical solution which allows a voltage transformer, useful for supplying network services, to be mounted on a high voltage support; thanks to this solution, however, the continuity of the transmission of high voltage electrical energy is ensured in the event of a failure.

BACKGROUND

As is known, the distribution of electricity to users is achieved through an electricity distribution network, which includes low-voltage power lines (between 50 and 1,000 V), powered by high-voltage lines (between 35 and 400 kV). The transmission of electrical energy over long distances is more efficient by operating at high voltage while, approaching the end user, the voltage needs to be progressively lowered for safety reasons (the risk of electrocution is lowered) and also because generally the electrical loads of domestic users work at low voltage.

The power line is the network infrastructure intended for the transmission of high voltage electrical energy and can comprise, for example, a plurality of overhead power lines supported by a plurality of pylons.

The conversion, from high voltage electricity to low voltage electricity, takes place by means of voltmeter transformers, housed in special cabins located on the ground near the supports of the power line.

For obvious reasons of land occupation and, consequently, for authoritative reasons, as well as for aspects of social and environmental sustainability (just think that often the power line pylons can also be located adjacent to cultivated fields), recently a solution has been taken into consideration that provides for the positioning of the voltage transformers directly on the support.

As is known, a plurality of devices act on high voltage networks, known as line switches, which are capable of interrupting the major electric currents that are being generated, in the event of a fault, by means of automatic action controlled by special measuring devices called protection relays. In other words, by means of the line breakers it is possible to quickly disconnect the faulty portion of the network, limiting as much as possible the thermal and mechanical effects that the fault currents cause on the other network elements. If, for example, a fault occurs on the line of the voltage transformer used to transform energy from high voltage to low voltage, the line switches open to isolate the portion of the high voltage line involved, thus interrupting the passage of electric current.

Obviously, an interruption in the passage of electric current and therefore in the operation of a high voltage backbone is highly inconvenient, and therefore there is a need to have a solution which, following a fault on the transformer voltmeter, connected in a branch on the high voltage electric line, allows the almost immediate restoration of the operation of the high voltage lines. In other words, there is a need for a technical solution that guarantees the continuity of transmission of electrical energy on the high voltage backbones even in the event of a fault on a voltage transformer located directly on the high voltage support.

The inventors of the present invention have created an electro-mechanical safety disconnector for the rapid restoration of operation of the high voltage backbone in the situation in which the voltage transformer connected to it is mounted directly on the support of the high voltage electric line.

SUMMARY

The object of the present invention is an electro-mechanical disconnector installed between a conductor of a high voltage overhead power line (hereinafter the term “high voltage” is rendered by the acronym “HV”) and a voltage transformer mounted on a support for support of HV overhead power line conductors; said electro-mechanical disconnector being characterized in that it comprises a sectioning element and a sacrificial element disposed in series with each other for electrically connecting said conductor to said voltage transformer; said sacrificial element is made of a material able to melt when a fault current passes; said isolating element is able to place itself at an electrical insulation distance in the air from said conductor following the melting of said sacrificial element.

Preferably, said isolating element comprises an operating arm having a first end connected to said sacrificial element and a second end included in a hinge assembly able to allow rotation of the operating arm itself.

The operating arm can consist of a rigid rod or a flexible element, such as for example a rope.

Preferably, said sacrificial element is made of a material subject to melting due to the passage of a fault electric current and which has such a mechanical strength as to resist the action of the wind; more preferably this material is included in the group consisting of steel, copper and conductive alloys.

Preferably, said electro-mechanical disconnector comprises a collection cup, arranged to surround said sacrificial element supposed to undergo fusion. More preferably, the collection cup is fixed to said first end of the operating arm.

BRIEF DESCRIPTION OF THE DRAWINGS

For a better understanding of the present invention, a particular embodiment is described below for illustrative and non-limiting purposes with the aid of the accompanying figures, in which.

DETAILED DESCRIPTION

Figure 1:
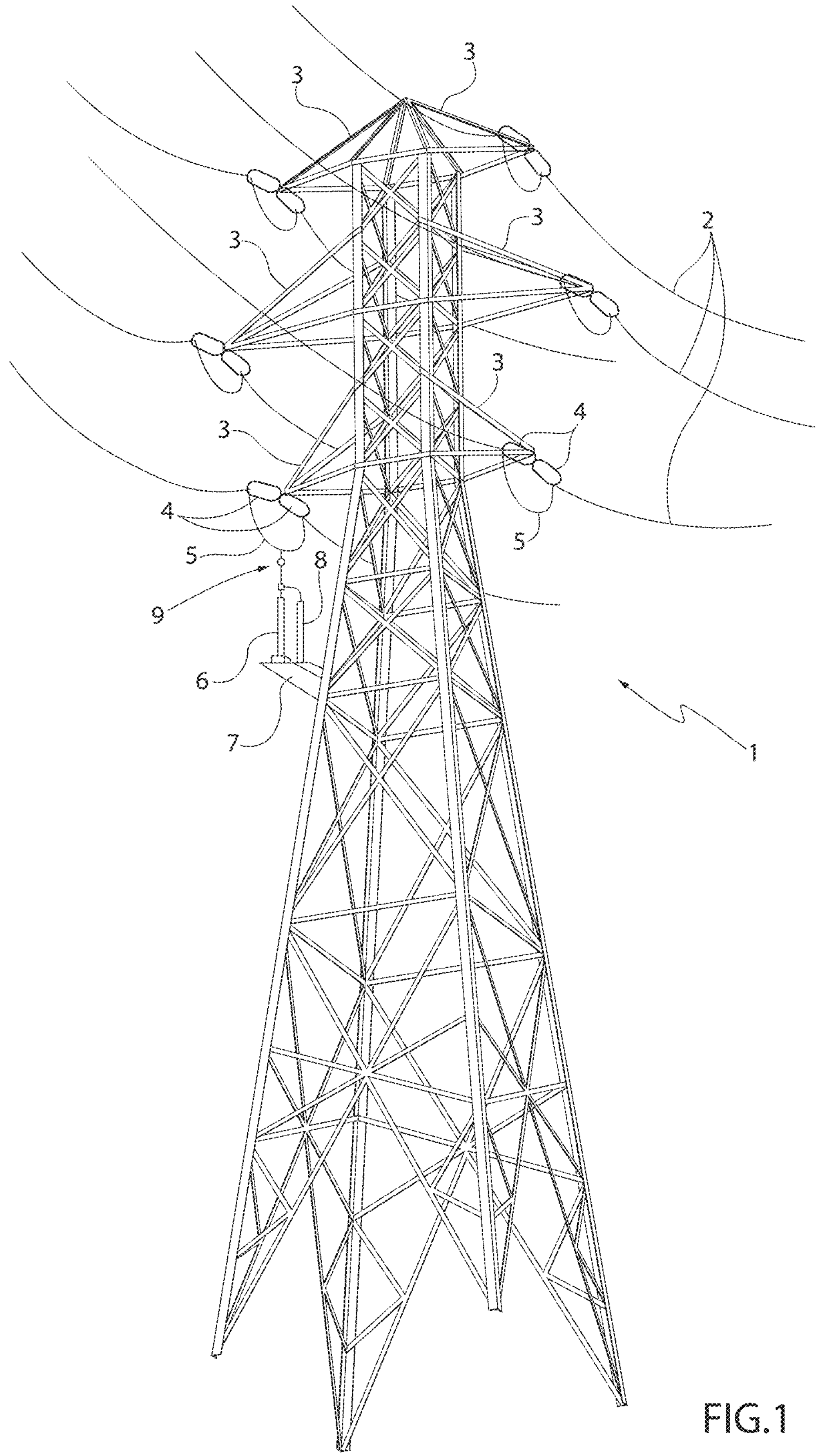
FIG. 1 illustrates a support, for example of the trellis type, for the support of HV overhead electric line conductors on which an electro-mechanical disconnector according to the present invention is mounted.

Number 1 in FIG. 1 indicates a support, for example of the trellis type, useful for supporting conductors 2 of an HV overhead electric line. In particular, the support of FIG. 1 is an anchor support, in which a plurality of brackets 3 support the conductors 2 through the insertion of suitable insulators 4. As known to a person skilled in the art, electrical continuity at the insulators 4 is ensured by an electrical connection 5, known in the jargon as a "dead neck".

On the support 1 a voltage transformer 6 is mounted for the conversion of electrical energy from high voltage to low voltage. The voltage transformer 6 is supported by a special bracket 7 on which a discharger 8 is also positioned, necessary to protect the voltage transformer 6 from over-voltages.

Mounted on the support 1 is an electro-mechanical disconnector 9 arranged between the voltage transformer 6 and a conductor 2. In particular, in its closed operating phase, the electro-mechanical disconnector 9 electrically connects the voltage transformer 6 to an electrical connection 5 of a related conductor 2.

Figure 2B:
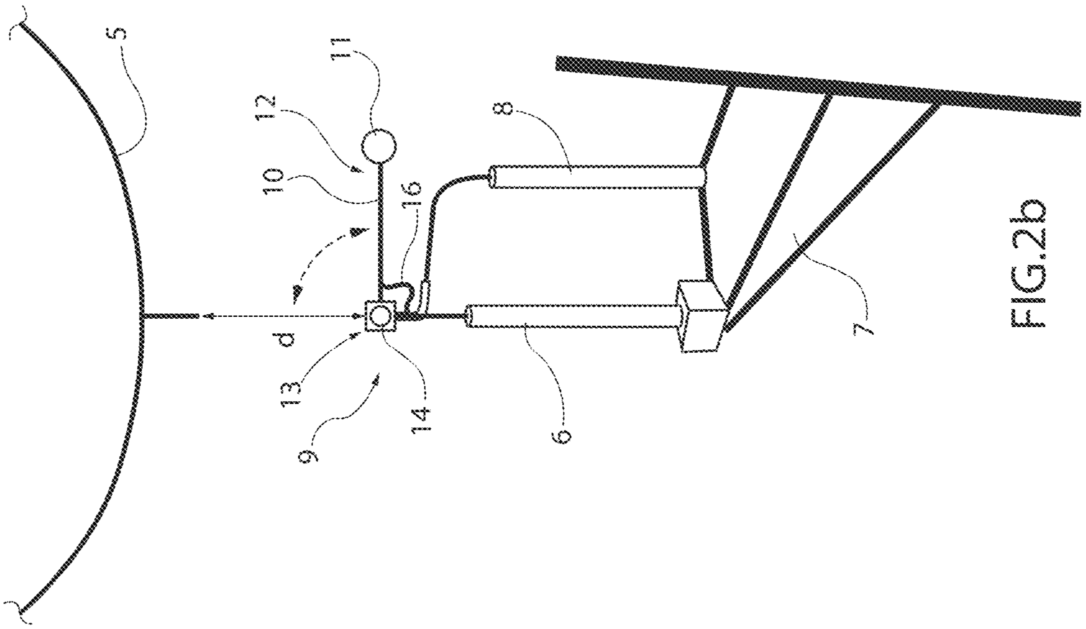
FIGS. 2*a* and 2*b* illustrate the electro-mechanical disconnector of FIG. 1 in two operating phases and with parts represented in schematic form.
Figure 2A:
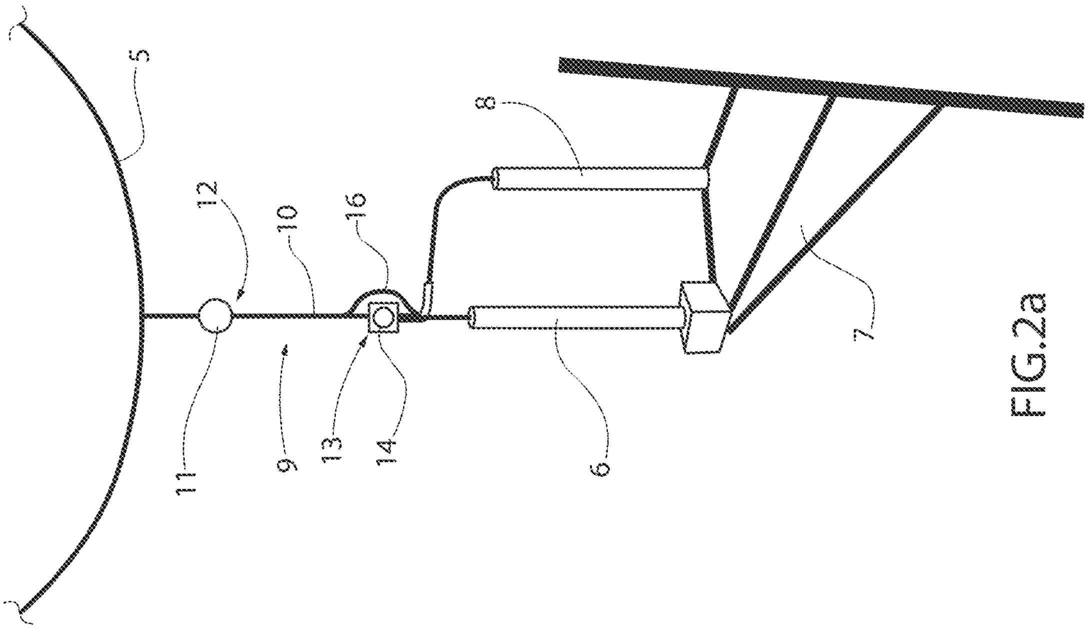

As illustrated in FIGS. 2*a* and 2*b*, the electro-mechanical disconnector 9 comprises an operating arm 10, composed of a rod of conductive material, and a sacrificial element 11 (illustrated schematically) connected both to a first end 12 of the moving arm 10 and to the electrical connection 5 by means of, for example, a T-clamp.

According to a preferred embodiment, the operating arm 10 is a rigid rod. However, different from what has been described above, the operating arm 10 can consist of a cord or other flexible element, also of conductive material.

The sacrificial element 11 is composed of an electrically conductive element, which is made of a material apt to melt due to the passage of a fault electric current and which, at the same time, has a suitable mechanical performance such as to resist the action of the wind.

According to one aspect of the invention the sacrificial element 11 is made of steel or copper or other conductive alloy with suitable mechanical and electrical properties.

From the illustration in FIG. 2*a*, in the operating phase of closing the electro-mechanical disconnector 9, the assembly consisting of the operating arm 10 and the sacrificial element 11 constitutes an electrical connection line between the conductor 2 (with its related electrical connection 5) and the voltage transformer 6.

A second end 13 of the operating arm 10 is connected to a hinge assembly 14, illustrated schematically. As may be obvious to a person skilled in the art, the hinge assembly 14 also comprises a flexible conductor braid 16 useful for ensuring the connection also at the hinge gear.

The hinge group 14 is made in such a way that, once the sacrificial element 11 melts, the operating arm 10 performs a rotation moving into its opening phase as illustrated in FIG. 2*b*. In other words, when the sacrificial element 11 melts, the first end 12 of the operating arm 10 will no longer be constrained and the hinge assembly forces the operating arm 10 itself to rotate. The rotation of the operating arm 10 leads to obtaining a suitable electrical insulation distance d, which guarantees the electrical insulation between the electrical connection 5 and the voltage transformer 6.

In greater detail, the distance d is greater than 1.5 m if the operating voltage of the HV line is equal to 150 kV and greater than 3.5 m if the operating voltage of the HV line is equal to 380 kV.

Differently from what has been described above, the isolating element according to the invention can be different from an operating arm, provided it is capable of guaranteeing that the aforementioned electrical insulation distance in the air will be reached. In fact, the electrical insulation distance in the air is necessary for carrying out the opening operating phase of the electro-mechanical disconnector which must be able to guarantee the absolute absence of an electrical connection between the high voltage overhead power line and the voltage transformer involved in the fault.

In the event of a fault inside the voltage transformer 6, the line switches at the ends of the HV backbone open to isolate the section of line involved while, at the same time, the sacrificial element 11 melts as a fault current passes through it. The fusion of the sacrificial element 11 frees the first end 12 of the operating arm 10 which, consequently, opens, creating the necessary electrical insulation distance in the air. At this point, the faulty component is disconnected, and the line switches close automatically, restoring electrical operation of the HV backbone. All this is sorted out, therefore, with a voltage dip of a few milliseconds.

Figure 3:
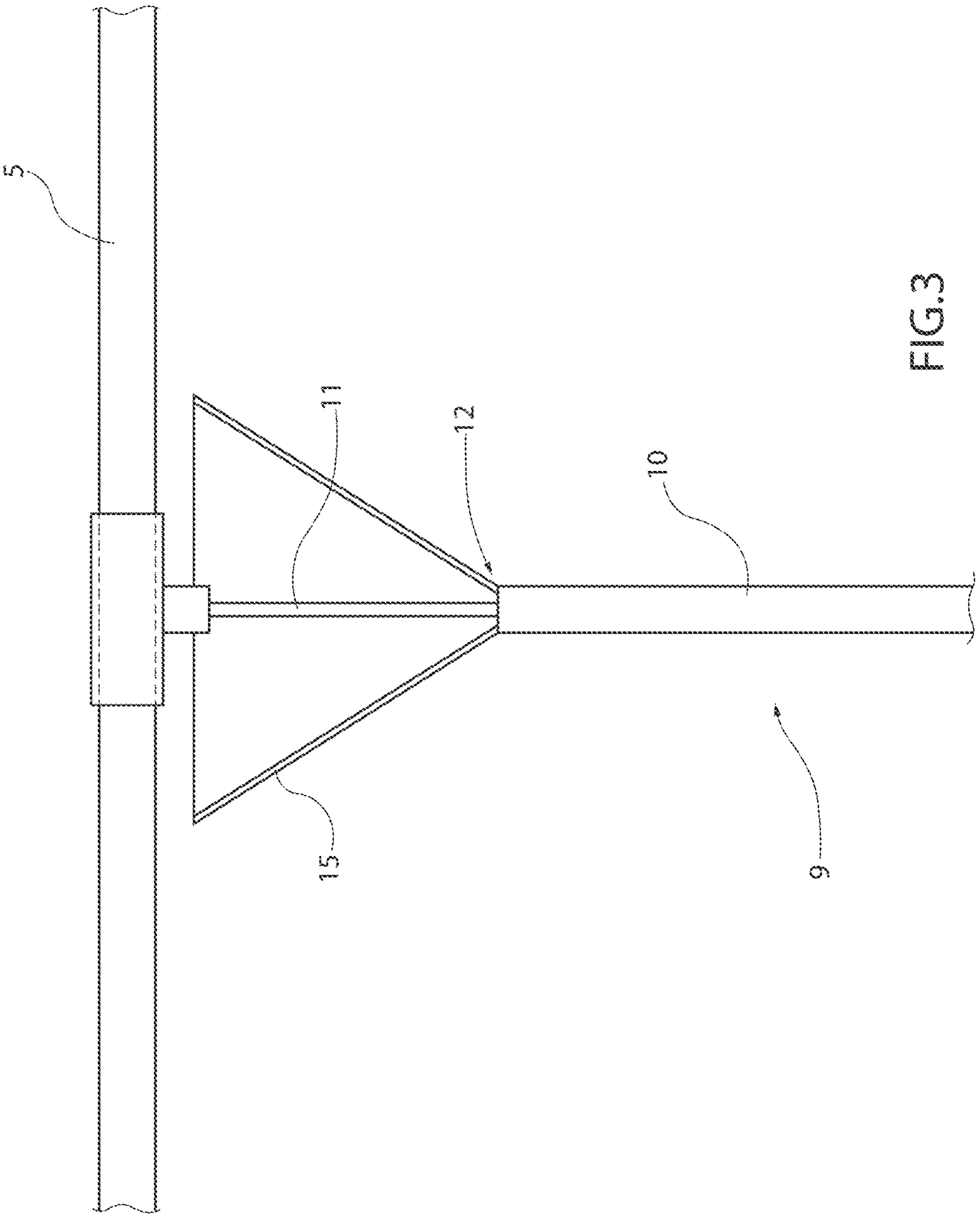
FIG. 3 is an enlargement of a detail of the electro-mechanical disconnector of FIG. 1.

As illustrated in FIG. 3, the electro-mechanical disconnector 9 comprises a collection cup 15 fixed to the first end 12 of the operating arm 10 and arranged to surround the sacrificial element 11. In this way, when the sacrificial element 11 melts, the dissolved material is not dispersed in the environment but is deposited on the walls of the collection cup 15. This prevents problems both in terms of safety for third parties and in terms of potential environmental pollution.

Advantageously, the collection cup 15 also has the function of reducing the electric field around the sacrificial element which otherwise, due to its small section, would give rise to an intense electric gradient value on the surface, noise problems and radio interference due to the corona effect.

The invention claimed is:

1. An electromechanical disconnector installed between a high-voltage overhead conductor of a high-voltage overhead transmission line and a voltage transformer mounted on a transmission tower for high-voltage overhead line conductors; said electromechanical disconnector comprising:

a sectioning element and a sacrificial element arranged in series so as to electrically connect said conductor to said voltage transformer;

said sacrificial element being made of a material suited to melt upon a passage of a fault current; and said sectioning element being suited to place itself at an air electrical insulation distance from said conductor following the melting of said sacrificial element, wherein said sectioning element comprises an operating arm having a first end and a second end comprised in a hinge assembly suited to cause a rotation of the operating arm, and said sacrificial element being positioned at a head of the operating arm at said first end and directly interposed between said first end and said conductor to mechanically constrain the operating arm in a closed position whereby the sacrificial element is connected to said conductor, to electrically connect the conductor to said voltage transformer, such that, in an event of a fault within the voltage transformer, the sacrificial element melts and mechanically releases the first end of the operating arm, which consequently rotates about the hinge assembly to an open position as a direct consequence of being released from the mechanical constraint of the sacrificial element, thereby creating the electrical insulation distance in the air.

2. The electromechanical disconnector according to claim 1, wherein said operating arm is a stiff rod or a flexible element.

3. The electromechanical disconnector according to claim 1, further comprising a collecting cup arranged so as to surround said sacrificial element in order to gather the molten material.

4. The electromechanical disconnector according to claim 3, wherein a collecting cup is fixed to said operating arm close to the first end.

5. The electromechanical disconnector according to claim 1, wherein said sacrificial element is made of a material that melts due to the passage of a fault current and has a mechanical performance such as to resist wind action.

6. The electromechanical disconnector according to claim 5, wherein said sacrificial element is made of a material comprised in the group consisting of steel, copper, and conductive alloys.

7. The electromechanical disconnector according to claim 1, wherein said air electrical insulation is greater than 1.5 metres for an operating voltage of the high-voltage transmission line equal to 150 kV or greater than 3.5 metres for an operating voltage of the high-voltage transmission line equal to 380 kV.

8. A transmission tower for a high-voltage overhead transmission line, comprising a mechanical disconnector device according to claim 1 installed between a high-voltage overhead conductor of said high-voltage overhead transmission line and a voltage transformer associated with it.

* * * * *